(12) United States Patent
Inoue et al.

(10) Patent No.: US 10,385,922 B2
(45) Date of Patent: Aug. 20, 2019

(54) WHEEL BEARING APPARATUS AND SEALING DEVICE

(71) Applicant: JTEKT CORPORATION, Osaka-shi, Osaka (JP)

(72) Inventors: Yuya Inoue, Nagaokakyo (JP); Takuya Toda, Nara (JP); Teruyuki Wakisaka, Nagoya (JP); Takafumi Uemoto, Kashiwara (JP); Chiyoko Furuta, Yamatotakada (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/026,468

(22) Filed: Jul. 3, 2018

(65) Prior Publication Data

US 2019/0017551 A1 Jan. 17, 2019

(30) Foreign Application Priority Data

Jul. 14, 2017 (JP) ................................. 2017-137992

(51) Int. Cl.
*F16C 33/78* (2006.01)
*F16C 19/18* (2006.01)
*F16J 15/32* (2016.01)
*F16J 15/3256* (2016.01)

(52) U.S. Cl.
CPC .......... *F16C 33/7823* (2013.01); *F16C 19/18* (2013.01); *F16J 15/3256* (2013.01); *F16C 2326/02* (2013.01)

(58) Field of Classification Search
CPC .............. F16C 33/7883; F16C 15/3264; F16C 15/447; F16C 15/4472; F16C 15/4474; F16C 15/4476; F16C 15/4478; F16C 15/3256; F16C 19/18; F16C 33/7823; F16C 33/80; F16C 2326/02
See application file for complete search history.

(56) References Cited

U.S. PATENT DOCUMENTS 4,434,985 A * 3/1984 Sonnerat ............. F16C 33/7883
277/353
5,431,413 A * 7/1995 Hajzler ............... F16C 33/7859
277/317

(Continued)

FOREIGN PATENT DOCUMENTS

JP 2008-128378 A 6/2008

*Primary Examiner* — Alan B Waits
(74) *Attorney, Agent, or Firm* — Oliff PLC (57) ABSTRACT

A wheel bearing apparatus includes an outer ring, an inner shaft member, rolling elements, a cage, and a sealing device. The sealing device includes an annular slinger and a sealing member. The slinger has a first inclined surface provided on a radially outer side and on a side facing the sealing member such that a diameter of the first inclined surface increases toward a first side in an axial direction. The sealing member has a second inclined surface provided on the radially outer side and on a side facing the slinger such that a diameter of the second inclined surface increases toward a second side in the axial direction. The second inclined surface intersects with a virtual extension surface extending radially outwardly along the first inclined surface, and the second inclined surface is continuous with an inner peripheral surface of the radially outer portion.

6 Claims, 5 Drawing Sheets

(56) References Cited

U.S. PATENT DOCUMENTS

| | | | | |
|---|---|---|---|---|
| 5,975,534 | A * | 11/1999 | Tajima | F16J 15/3264 |
| | | | | 277/353 |
| 6,170,992 | B1 * | 1/2001 | Angelo | F16C 33/7883 |
| | | | | 277/551 |
| 2007/0246890 | A1 * | 10/2007 | Kobayashi | F16J 15/326 |
| | | | | 277/353 |
| 2009/0102134 | A1 * | 4/2009 | Shibayama | F16C 33/7883 |
| | | | | 277/351 |
| 2009/0206553 | A1 * | 8/2009 | Kanzaki | F16J 15/3256 |
| | | | | 277/351 |
| 2010/0025938 | A1 * | 2/2010 | Berdichevsky | F16J 15/3264 |
| | | | | 277/562 |
| 2014/0374996 | A1 * | 12/2014 | Duch | F16J 15/3232 |
| | | | | 277/562 |
| 2015/0014935 | A1 * | 1/2015 | Haepp | F16J 15/164 |
| | | | | 277/317 |
| 2015/0098670 | A1 * | 4/2015 | Gulli | F16J 15/3264 |
| | | | | 384/486 |
| 2016/0236509 | A1 * | 8/2016 | Gull | B60B 27/0073 |
| 2016/0245334 | A1 * | 8/2016 | Hagiwara | B60B 35/02 |
| 2017/0097045 | A1 * | 4/2017 | Umekida | B60B 35/18 |

* cited by examiner

WHEEL BEARING APPARATUS AND SEALING DEVICE

INCORPORATION BY REFERENCE

The disclosure of Japanese Patent Application No. 2017-137992 filed on Jul. 14, 2017 including the specification, drawings and abstract is incorporated herein by reference in its entirety.

BACKGROUND

1. Technical Field

The disclosure relates to a wheel bearing apparatus and a sealing device usable for the wheel bearing apparatus.

2. Description of Related Art

In a vehicle such as an automobile, a wheel bearing apparatus (a hub unit) is used to support a wheel. The wheel bearing apparatus includes an outer ring attached to a knuckle on the side of a vehicle body, an inner shaft member including a flange portion to which a wheel is attached, the flange portion being provided at a position on a first side in an axial direction (the outer side in the vehicle width direction), a plurality of balls (rolling elements) provided between the outer ring and the inner shaft member, and a cage that holds the balls. Such a wheel bearing apparatus further includes a sealing device (e.g., see Japanese Unexamined Patent Application Publication No. 2008-128378 (JP 2008-128378 A)), and the sealing device prevents foreign matter such as muddy water from entering an annular space (a bearing inner part, that is, an inside of the bearing apparatus) formed between the outer ring and the inner shaft member such that the balls are provided in the annular space.

Figure 5:
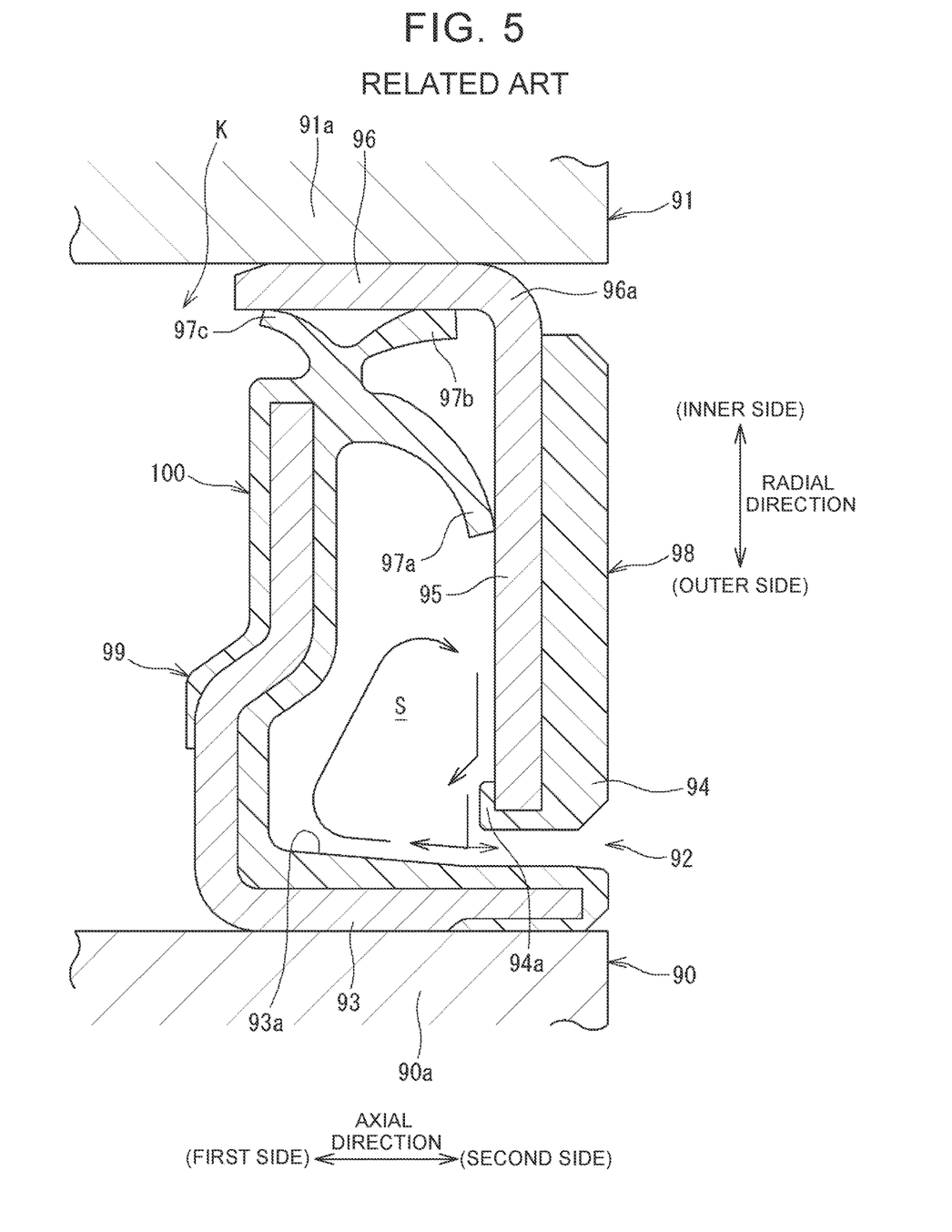
FIG. 5 is a sectional view illustrating a sealing device in related art.

As illustrated in FIG. 5, a sealing device 100 in related art has been known. The sealing device 100 includes an annular slinger 98 attached to a part 91a of an inner shaft member 91 on a second side in the axial direction (a side opposite to a flange portion in the axial direction), and an annular sealing member 99 attached to an end 90a of an outer ring 90 on the second side in the axial direction, and the sealing device 100 is configured such that lips 97a, 97b, 97c provided in the sealing member 99 are in contact with the slinger 98.

The slinger 98 includes a cylindrical portion 96 fitted to an outer periphery of the part 91a of the inner shaft member 91, and an annular portion 95 provided so as to extend radially outwardly from an end 96a of the cylindrical portion 96 on the second side in the axial direction. The slinger 98 further includes a coating portion 94 made of a rubber member and fixed to the annular portion 95, and the coating portion 94 serves as a magnetized pulsar ring facing a sensor configured to detect a rotation speed of the inner shaft member 91. Further, in order to increase the strength of fixation to the annular portion 95, the coating portion 94 includes a rubber winding portion 94a that covers an outer peripheral end of the annular portion 95.

The sealing member 99 includes a radially outer portion 93 having a cylindrical shape and attached to the end 90a of the outer ring 90 in a fitted manner, and a gap 92 is formed between the radially outer portion 93 and the slinger 98 (the coating portion 94).

SUMMARY

In a case of a vehicle (e.g., an automobile) that travels in an environment where a road is often flooded, when water comes up to a half of the height of wheels, for example, muddy water may enter an annular internal space S formed between the slinger 98 and the sealing member 99 through the gap 92 of the sealing device 100 illustrated in FIG. 5, in the wheel bearing apparatus.

When the wheel bearing apparatus (the inner shaft member 91) rotates, the slinger 98 also rotates, and thus, the muddy water inside the internal space S moves radially outwardly due to centrifugal force. As a result, the muddy water hits the rubber winding portion 94a, and thus, the muddy water has a component of velocity directed toward the first side in the axial direction and the muddy water can be hardly discharged from the gap 92. Further, when the muddy water flows radially outwardly along the rubber winding portion 94a, the muddy water collides with an inner peripheral surface 93a of the radially outer portion 93 of the sealing member 99 so as to flow in a divided manner toward the first side in the axial direction and the second side in the axial direction. However, since a flow resistance is large in the gap 92, most of the muddy water is directed to the first side in the axial direction that is the side opposite to the gap 92. Therefore, when the muddy water enters the internal space S once, the muddy water flows backward in the internal space S, and thus, the muddy water can be hardly discharged to the outside.

Since the lip 97a and the like are in contact with the slinger 98, it is possible to prevent a situation in which the muddy water entering the internal space S enters an annular space (a bearing inner part) K where the balls (rolling elements) (not shown) are provided. However, if the muddy water stays in the internal space S for a long period of time, the lip 97a may be worn by mud and the like, and this causes a decrease in life of the sealing device 100.

The disclosure makes it possible to easily discharge foreign matter such as muddy water to an outside of a sealing device even if the foreign matter enters an internal space between a slinger and a sealing member.

A first aspect of the disclosure relates to a wheel bearing apparatus including an outer ring attached to a vehicle-body-side member; an inner shaft member including a flange portion to which a wheel is attached, the flange portion being provided at a position on a first side in an axial direction; a plurality of rolling elements provided in an annular space between the outer ring and the inner shaft member; a cage configured to hold the plurality of rolling elements; and a sealing device provided on a second side in the axial direction and configured to prevent foreign matter from entering the annular space from between the outer ring and the inner shaft member. The sealing device includes a slinger having an annular shape and attached to the inner shaft member at a position on the second side in the axial direction, and a sealing member including a radially outer portion having a cylindrical shape and attached to the outer ring at a position on the second side in the axial direction so as to face an outer peripheral surface of the slinger via a gap, a radially inner portion extending radially inwardly from the radially outer portion, and a lip extending from the radially inner portion so as to be in contact with the slinger. The slinger has a first inclined surface provided on a radially outer side and on a side facing the sealing member such that a diameter of the first inclined surface increases toward the first side in the axial direction. The sealing member has a second inclined surface provided on the radially outer side and on a side facing the slinger such that a diameter of the second inclined surface increases toward the second side in the axial direction. The second inclined surface intersects with a virtual extension surface extending radially outwardly along the first inclined surface, and the second inclined surface is continuous with an inner peripheral surface of the radially outer portion.

In the wheel bearing apparatus according to the aspect, in a case where foreign matter such as muddy water enters an internal space between the slinger and the sealing member, when the slinger rotates together with the inner shaft member, the muddy water inside the internal space moves radially outwardly due to centrifugal force. At this time, the muddy water is guided radially outwardly toward the first side in the axial direction along the first inclined surface of the slinger and is then guided radially outwardly toward the second side in the axial direction along the second inclined surface of the sealing member. Further, the muddy water flows along the inner peripheral surface of the sealing member (the radially outer portion) continuous with the second inclined surface, so as to be discharged to the outside of the sealing device through the gap. Thus, even if foreign matter such as muddy water enters the internal space, the foreign matter is guided along the first inclined surface and the second inclined surface by centrifugal force due to rotation of the wheel bearing apparatus. Thus, the foreign matter can be easily discharged to the outside of the sealing device.

The slinger may have an auxiliary inclined surface provided on the side facing the sealing member at a position radially inward of the first inclined surface such that a diameter of the auxiliary inclined surface increases toward the first side in the axial direction. With this configuration, the muddy water in the internal space can be gradually guided radially outwardly toward the first side in the axial direction by the auxiliary inclined surface and the first inclined surface. Thus, it is possible to enhance a function to discharge the muddy water to the outside of the sealing device.

An angle formed between the second inclined surface and the virtual extension surface in a section including a bearing central axis may be less than 90°. With this configuration, when the muddy water guided along the first inclined surface hits the second inclined surface, a direction where the muddy water moves along the second inclined surface is easily directed radially outwardly. This makes it possible to further easily discharge the muddy water through the gap.

The slinger may include an inner cylindrical portion attached to the inner shaft member at a position on the second side in the axial direction, an annular portion extending radially outwardly from the inner cylindrical portion, and an outer cylindrical portion extending toward the first side in the axial direction from a radially outer end of the annular portion; the first inclined surface may be provided on an inner peripheral side portion of the outer cylindrical portion; and the gap may be formed between the inner peripheral surface of the radially outer portion and an outer peripheral surface of the outer cylindrical portion such that the gap serves as a labyrinth gap that restrains entrance of foreign matter. With this configuration, the labyrinth gap is formed between the outer cylindrical portion of the slinger and the radially outer portion of the sealing member. The outer cylindrical portion is provided so as to extend toward the first side in the axial direction, and thus, the outer cylindrical portion is long in the axial direction. Thus, the labyrinth gap is long in the axial direction. This makes it difficult for foreign matter to enter an inside of the wheel bearing apparatus.

The sealing member may include a metal core, and an elastic member fixed to the metal core; and a part forming the second inclined surface may be included in a part of the elastic member. In this case, when the elastic member is formed with the use of a mold, the metal core is set inside the mold, and thus, the elastic member can be fixed to the metal core at the time of forming. At this time, the second inclined surface can be formed in accordance with a shape of the mold. That is, when a part of the mold has a predetermined shape, the second inclined surface can be formed in the above-described shape, and thus, the second inclined surface can be easily formed.

The first inclined surface may be a tapered surface having an inside diameter that is largest at an end on the first side in the axial direction; the second inclined surface may be a tapered surface having an inside diameter that is largest at an end on the second side in the axial direction; and a distance, in the axial direction, from the second inclined surface to the first inclined surface and the virtual extension surface may gradually decrease toward the radially outer side. With this configuration, the muddy water inside the internal space is gathered on the radially outer side due to centrifugal force, and thus, the muddy water is easily discharged to the outside of the sealing device through the gap.

A second aspect of the disclosure relates to a sealing device configured to prevent foreign matter from entering an annular space formed between a cylindrical outer ring and an inner shaft member provided radially inward of the outer ring. The sealing device includes a slinger having an annular shape and attached to the inner shaft member; and a sealing member including a radially outer portion having a cylindrical shape and attached to the outer ring so as to face an outer peripheral surface of the slinger via a gap, a radially inner portion extending radially inwardly from the radially outer portion, and a lip extending from the radially inner portion so as to be in contact with the slinger. The slinger has a first inclined surface provided on a radially outer side and on a side facing the sealing member such that a diameter of the first inclined surface increases toward a first side in an axial direction. The sealing member has a second inclined surface provided on the radially outer side and on a side facing the slinger such that a diameter of the second inclined surface increases toward a second side in the axial direction. The second inclined surface intersects with a virtual extension surface extending radially outwardly along the first inclined surface, and the second inclined surface is continuous with an inner peripheral surface of the radially outer portion.

With the sealing device according to the aspect, in a case where foreign matter such as muddy water enters the internal space between the slinger and the sealing member, when the slinger rotates together with the inner shaft member, the muddy water inside the internal space moves radially outwardly due to centrifugal force. At this time, the muddy water is guided radially outwardly toward the first side in the axial direction along the first inclined surface of the slinger and is then guided radially outwardly toward the second side in the axial direction along the second inclined surface of the sealing member. Further, the muddy water flows along the inner peripheral surface of the sealing member (the radially outer portion) continuous with the second inclined surface, so as to be discharged to the outside of the sealing device through the gap. Thus, even if foreign matter such as muddy water enters the internal space, the foreign matter is guided along the first inclined surface and the second inclined surface by centrifugal force. Thus, the foreign matter can be easily discharged to the outside of the sealing device.

According to the aspects of the disclosure, even if foreign matter such as muddy water enters the internal space of the sealing device, the foreign matter is guided along the first inclined surface and the second inclined surface by centrifugal force, and thus, the foreign matter can be easily discharged to the outside of the sealing device. This makes it possible to restrain the foreign matter such as muddy water from staying in the internal space, thereby making it possible to achieve a long life of the sealing device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
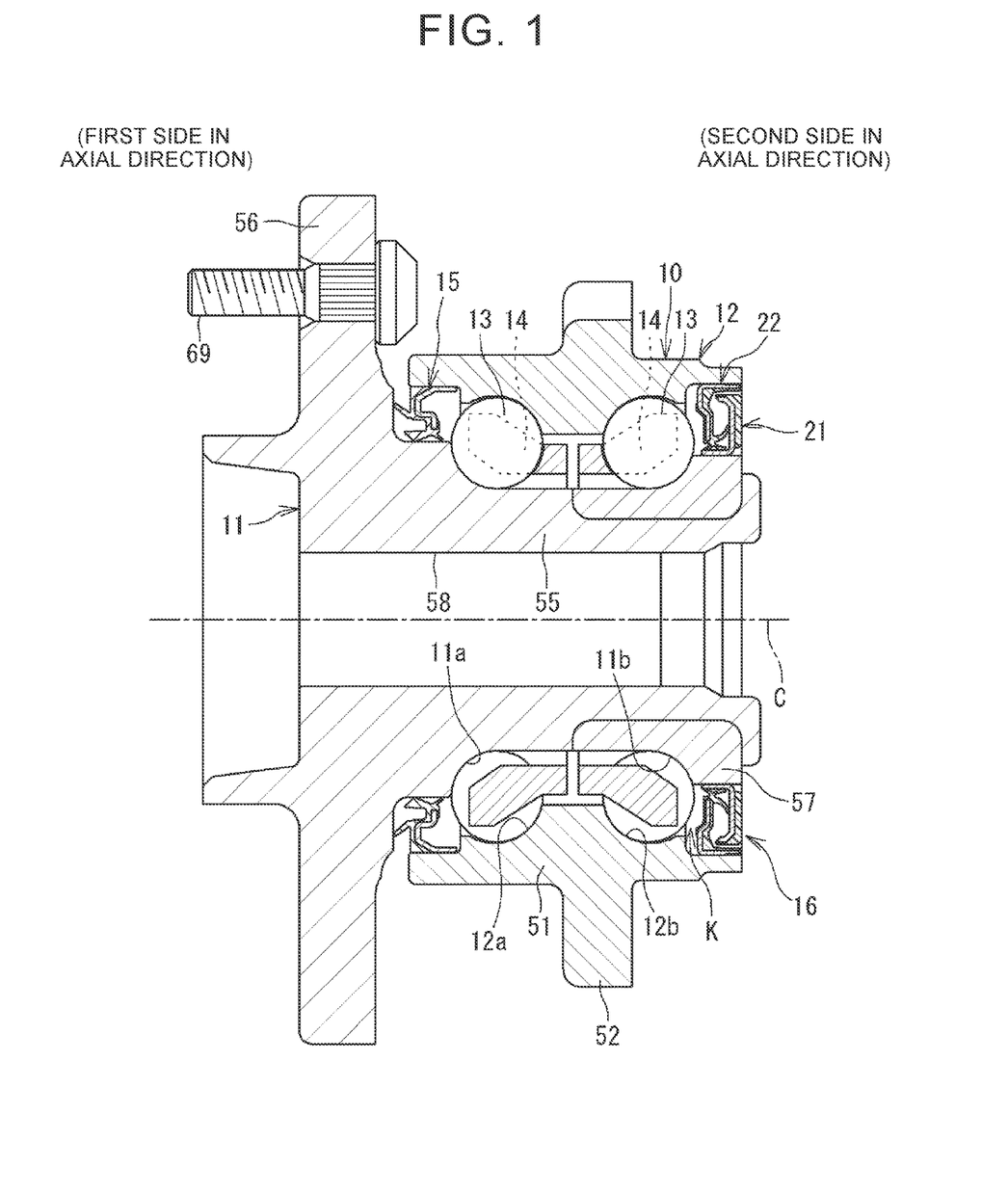
FIG. 1 is a sectional view of a wheel bearing apparatus.

FIG. 1 is a sectional view of a wheel bearing apparatus. The wheel bearing apparatus (hub unit) 10 is attached to a suspension (knuckle) provided on a side of a vehicle body of a vehicle (e.g., an automobile) and supports a wheel such that the wheel is rotatable. The wheel bearing apparatus 10 includes an inner shaft member 11, an outer ring 12, rolling elements 13, a cage 14, a first sealing device 15 provided on a first side in an axial direction, and a second sealing device 16 provided on a second side in the axial direction. In the wheel bearing apparatus 10, the axial direction is a direction parallel to a central axis C of the wheel bearing apparatus 10 (hereinafter referred to as a bearing central axis C). Further, the radial direction is a direction perpendicular to the axial direction.

The outer ring 12 includes an outer ring body portion 51 having a cylindrical shape, and a flange portion 52 for fixation provided so as to extend radially outwardly from the outer ring body portion 51. Outer-ring raceway surfaces 12a, 12b are formed on an inner peripheral side portion of the outer ring body portion 51. The outer ring 12 is attached, via the flange portion 52, to the knuckle (not shown) that is a vehicle-body-side member, and thus, the wheel bearing apparatus 10 including the outer ring 12 is fixed on the side of the vehicle body. In a state where the wheel bearing apparatus 10 is fixed on the side of the vehicle body, a side where a flange portion 56 (described later) for wheel attachment included in the inner shaft member 11 is provided corresponds to the outside of the vehicle. That is, the first side in the axial direction on which the flange portion 56 is provided corresponds to the outer side in the vehicle width direction, and the second side in the axial direction that is opposite to the first side in the axial direction corresponds to the inner side in the vehicle width direction.

The inner shaft member 11 includes an inner shaft (hub spindle) 58, and an inner ring 57 fitted to an outer periphery of the inner shaft 58 at a position on the second side in the axial direction. The inner shaft 58 includes a shaft body portion 55 provided radially inward of the outer ring 12, and the flange portion 56 for wheel attachment. The shaft body portion 55 is a shaft member elongated in the axial direction. The flange portion 56 is provided so as to extend radially outwardly from the first side of the shaft body portion 55 in the axial direction. A bolt 69 for wheel attachment is attached to the flange portion 56, and a brake rotor is attached to the flange portion 56 in addition to a wheel (not shown). The inner ring 57 is an annular member and is fitted to an outer periphery of an end of the shaft body portion 55 on the second side in the axial direction so as to be fixed thereto. A shaft raceway surface 11a is formed on an outer peripheral surface of the shaft body portion 55, and an inner-ring raceway surface 11b is formed on an outer peripheral surface of the inner ring 57.

A plurality of balls as the rolling elements 13 is disposed between the outer-ring raceway surface 12a on the first side in the axial direction and the shaft raceway surface 11a, and a plurality of balls as the rolling elements 13 is disposed between the outer-ring raceway surface 12b on the second side in the axial direction and the inner-ring raceway surface 11b. As described above, the rolling elements 13 are provided in two rows in an annular space (bearing inner part) K formed between the outer ring 12 and the inner shaft member 11, and the rolling elements 13 included in each row are maintained at intervals in the circumferential direction by the annular cage 14.

The first sealing device 15 prevents foreign matter such as muddy water from entering the annular space K from between the outer ring 12 and the inner shaft member 11, in the first side of the wheel bearing apparatus 10 in the axial direction. The second sealing device 16 prevents foreign matter such as muddy water from entering the annular space K from between the outer ring 12 and the inner shaft member 11 (the inner ring 57), in the second side of the wheel bearing apparatus 10 in the axial direction.

Figure 2:
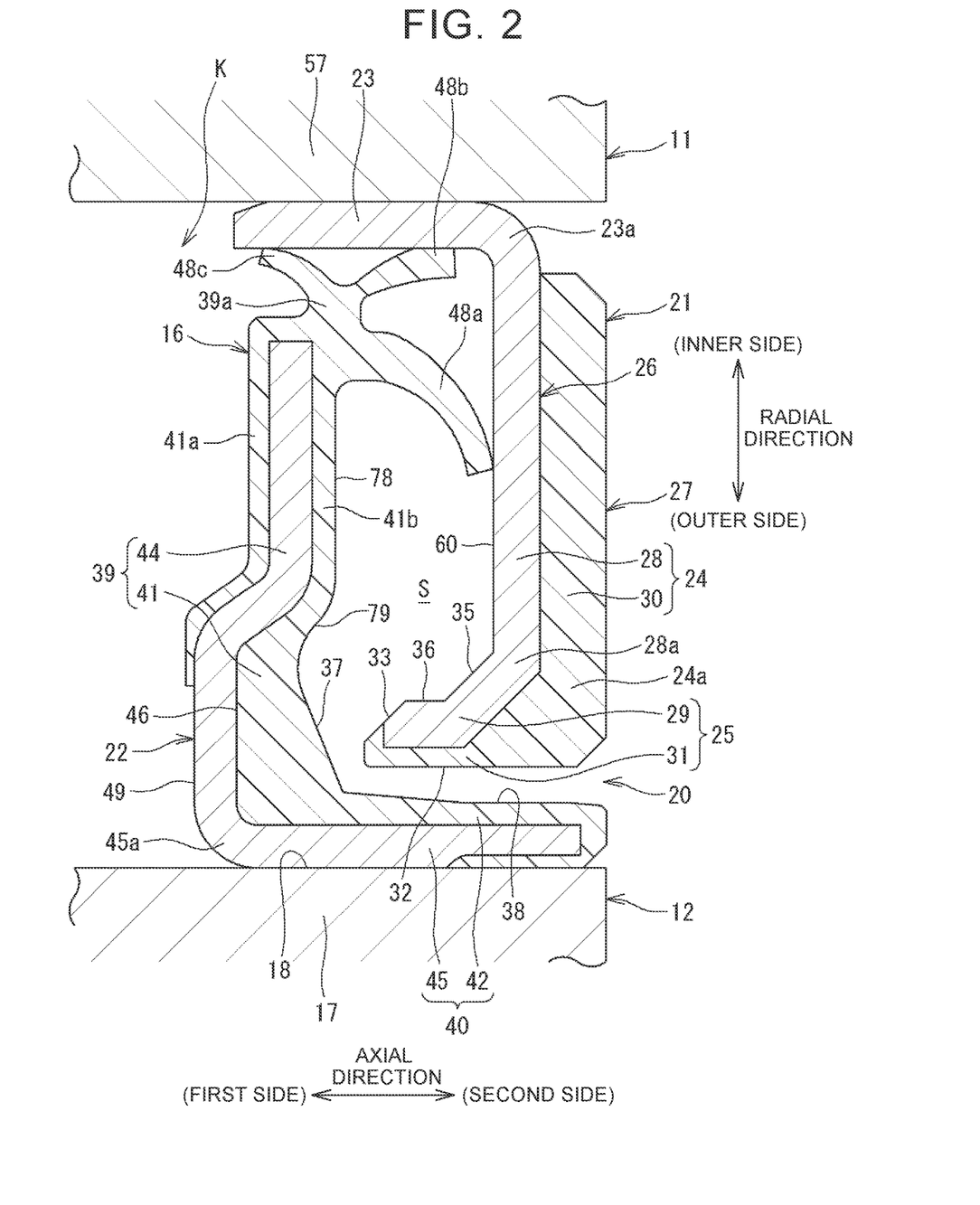
FIG. 2 is a sectional view of a lower side (a ground side) of a sealing device illustrated in FIG. 1.

The second sealing device 16 is described. FIG. 2 is a sectional view of a lower side (a ground side) of the sealing device 16 illustrated in FIG. 1. The sealing device 16 includes a slinger 21 and a sealing member 22. The slinger 21 is attached to the inner ring 57 provided on the inner shaft member 11 at a position on the second side in the axial direction. The sealing member 22 is attached to an end 17 of the outer ring 12 on the second side in the axial direction. Each of the slinger 21 and the sealing member 22 has an annular shape and has the same sectional shape along the circumferential direction.

The slinger 21 of the present embodiment includes a slinger body portion 26 made of metal (e.g., made of stainless steel), and a rubber coating portion 27 fixed to the slinger body portion 26. The coating portion 27 serves as a magnetized pulsar ring facing a sensor (not shown) that detects a rotation speed of the inner shaft member 11. The slinger body portion 26 includes an inner cylindrical portion 23 having a cylindrical shape, an annular body portion 28 having an annular shape and extending radially outwardly from an end 23a of the inner cylindrical portion 23 on the second side in the axial direction, and an outer tubular body portion 29 having a cylindrical shape and extending toward the first side in the axial direction from an end 28a at a radially outer side of the annular body portion 28. The coating portion 27 includes an annular coating portion 30 having an annular shape and integrated with the annular body portion 28, and a cylindrical outer peripheral coating portion 31 provided continuously with the annular coating portion 30 and integrated with the outer tubular body portion 29. An annular portion 24 of the slinger 21 is formed by the annular body portion 28 and the annular coating portion 30, and an outer cylindrical portion 25 of the slinger 21 is formed by the outer tubular body portion 29 and the outer peripheral coating portion 31.

As described above, the slinger 21 includes the inner cylindrical portion 23, the annular portion 24, and the outer cylindrical portion 25. The inner cylindrical portion 23 is fitted to an outer periphery of the inner ring 57 with an interference, and thus, the slinger 21 is fixed to the inner shaft member 11. The annular portion 24 is an annular portion provided so as to extend radially outwardly from the end 23a of the inner cylindrical portion 23 on the second side in the axial direction, and the outer cylindrical portion 25 is a cylindrical portion provided so as to extend toward the first side in the axial direction from an end 24a at the radially outer side of the annular portion 24.

The sealing member 22 includes a metal core 49 made of metal (e.g., made of stainless steel), and an elastic member 46 made of rubber and fixed to the metal core 49. The metal core 49 of the present embodiment includes a metal core tubular portion 45 having a cylindrical shape and fitted to an inner peripheral surface 18 of the end 17 of the outer ring 12 on the second side in the axial direction, and a metal core body portion 44 having an annular shape and extending radially inwardly from an end 45a of the metal core tubular portion 45 on the first side in the axial direction. The elastic member 46 of the present embodiment includes an elastic tubular portion 42 having a cylindrical shape and integrated with the metal core tubular portion 45, an elastic annular portion 41 having an annular shape and integrated with the metal core body portion 44, and three lips 48a, 48b, 48c extending toward corresponding parts of the slinger 21 from an inner peripheral portion 39a of the elastic annular portion 41. The elastic annular portion 41 is provided from the first side of the metal core body portion 44 to the second side thereof in the axial direction, and includes a first annular portion 41a on the first side in the axial direction and a second annular portion 41b on the second side in the axial direction with the metal core body portion 44 being sandwiched between the first annular portion 41a and the second annular portion 41b. A radially outer portion 40 of the sealing member 22 is formed by the elastic tubular portion 42 and the metal core tubular portion 45, and a radially inner portion 39 of the sealing member 22 is formed by the elastic annular portion 41 and the metal core body portion 44.

The radially outer portion 40 having a cylindrical shape is provided radially outward of the outer cylindrical portion 25 of the slinger 21, and an inner peripheral surface 38 of the radially outer portion 40 (the elastic tubular portion 42) faces an outer peripheral surface 32 of the outer cylindrical portion 25 (the outer peripheral coating portion 31) via a gap 20 in the radial direction. That is, the gap 20 is formed between the inner peripheral surface 38 and the outer peripheral surface 32. The gap 20 is a cylindrical space that is long along the axial direction, and the gap 20 is opened toward the second side in the axial direction. The gap 20 serves as a labyrinth gap that restrains foreign matter such as muddy water from entering the inside from the second side in the axial direction.

As described above, the sealing member 22 includes the radially outer portion 40, the radially inner portion 39, and the lips 48a, 48b, 48c sequentially from the radially outer side. The radially outer portion 40 has a cylindrical shape and is attached, in a fitted manner, to the end 17 of the outer ring 12 on the second side in the axial direction. The radially outer portion 40 faces the outer peripheral surface 32 of the slinger 21 via the gap 20. The radially inner portion 39 is an annular portion extending radially inwardly from the radially outer portion 40. The lips 48a, 48b, 48c extend from the inner peripheral portion 39a of the elastic annular portion 41 included in the radially inner portion 39 such that the lips 48a, 48b, 48c are in contact with the slinger 21. An annular internal space S is formed radially outward of the first lip 48a, between the slinger 21 and the sealing member 22.

A radial length of the gap 20 (hereinafter referred to as the labyrinth gap 20) is set to be small, thereby preventing foreign matter such as muddy water from entering the inside from the outside on the second side in the axial direction. In a case where a vehicle provided with the wheel bearing apparatus 10 of the present embodiment as illustrated in FIG. 1 is disposed on a flooded road and a water level is high, for example, foreign matter such as muddy water may enter the internal space S through the labyrinth gap 20. However, the first lip 48a is in contact with the annular body portion 28 and the second and third lips 48b, 48c are in contact with the inner cylindrical portion 23. Further, when the inner shaft member 11 rotates, the slinger 21 also rotates together with the inner shaft member 11. Thus, the lips 48a, 48b, 48c make slide contact with corresponding parts of the slinger 21. Therefore, even if foreign matter such as muddy water enters the internal space S, it is possible to prevent the foreign matter from reaching the annular space K where the rolling elements 13 are provided (see FIG. 1).

Further, the sealing device 16 illustrated in FIG. 2 has a function to discharge foreign matter such as muddy water entering the internal space S to the outside (i.e., the outside of the sealing device 16) on the second side in the axial direction through the labyrinth gap 20. The following describes a configuration for implementing the function.

Figure 3:
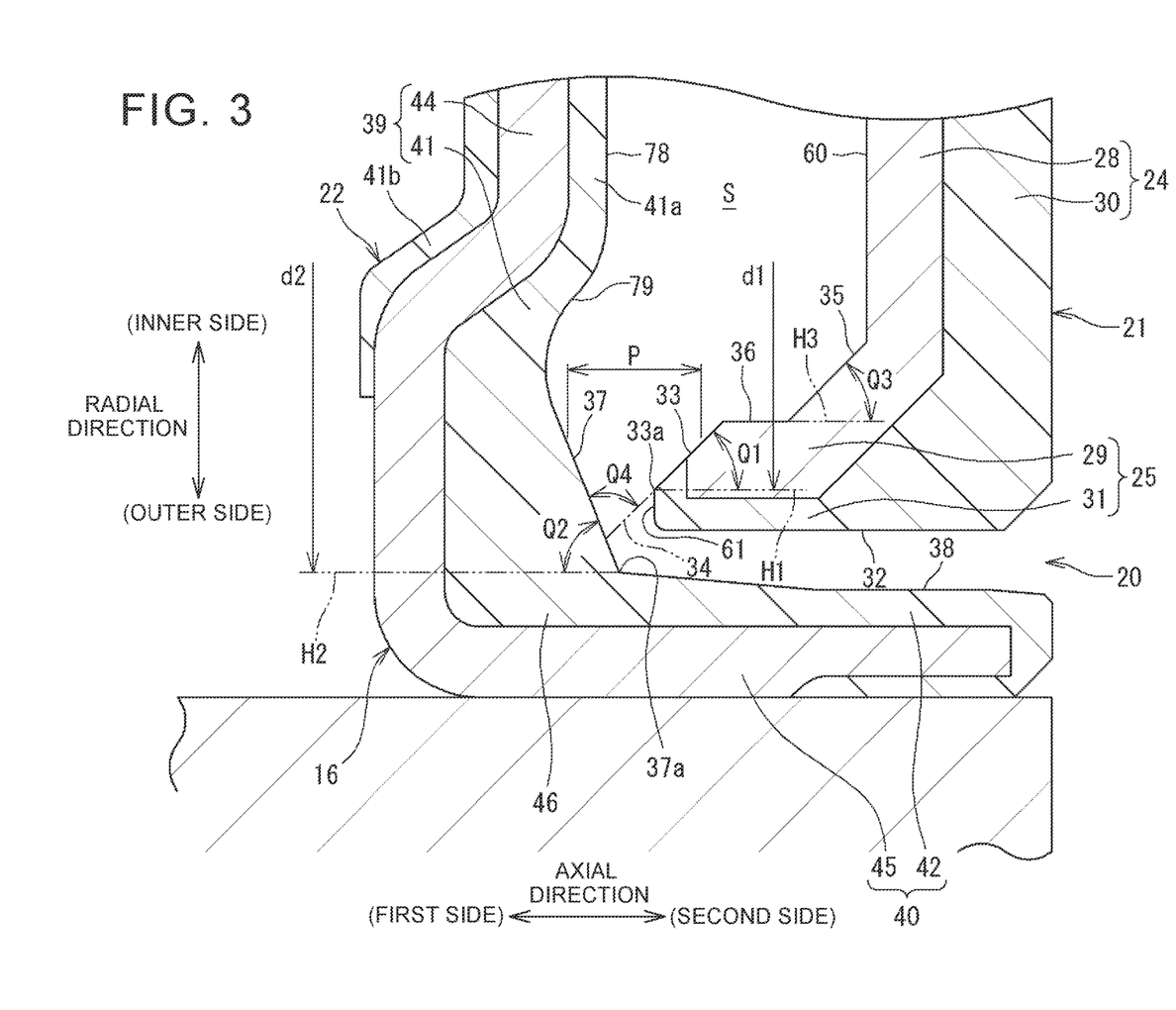
FIG. 3 is a sectional view of an outer peripheral part of the sealing device illustrated in FIG. 2 in an enlarged manner.

FIG. 3 is a sectional view of an outer peripheral part of the sealing device 16 illustrated in FIG. 2 in an enlarged manner. First, a configuration of the slinger 21 is described. The slinger 21 includes a first inclined surface 33 in a region on an inner peripheral side portion of the outer cylindrical portion 25 at a position on the first side in the axial direction. The first inclined surface 33 has a shape having a diameter increasing toward the first side in the axial direction, and the first inclined surface 33 in the present embodiment is a tapered surface having an inside diameter d1 that is largest at an end 33a on the first side in the axial direction. The first inclined surface 33 is inclined at an angle Q1 with respect to a virtual cylindrical surface H1 around the bearing central axis C (see FIG. 1).

The outer cylindrical portion 25 includes the outer tubular body portion 29 and the outer peripheral coating portion 31 as described above, and thus, the first inclined surface 33 is formed by a part of the outer tubular body portion 29 and a part of the outer peripheral coating portion 31. An outer peripheral surface of the outer cylindrical portion 25 is the outer peripheral surface 32 of the slinger 21, and a small annular surface 61 having an annular shape is provided between the first inclined surface 33 and the outer peripheral surface 32.

The slinger 21 further includes an auxiliary inclined surface 35 in a region on the inner peripheral side of the outer cylindrical portion 25 and on the second side in the axial direction. The auxiliary inclined surface 35 is a tapered surface having a diameter increasing toward the first side in the axial direction. The auxiliary inclined surface 35 is inclined at an angle Q3 with respect to a virtual cylindrical surface H3 around the bearing central axis C (see FIG. 1). A cylindrical inner peripheral surface 36 that is short in the axial direction is provided between the auxiliary inclined surface 35 and the first inclined surface 33. Thus, the outer cylindrical portion 25 includes the inclined surfaces (35, 33) in two stages on the inner peripheral side. A radially inner side of the auxiliary inclined surface 35 is continuous with a contact annular surface 60 having an annular shape and configured such that the first lip 48a (see FIG. 2) is in contact with the contact annular surface 60. The contact annular surface 60 has an annular shape along a virtual surface perpendicular to the bearing central axis C (see FIG. 1). As will be described later, when foreign matter such as muddy water inside the internal space S moves radially outwardly due to centrifugal force, the foreign matter such as muddy water flows radially outwardly along the contact annular surface 60, and after that, the foreign matter is smoothly guided radially outwardly toward the first side in the axial direction along the inclined surfaces (35, 33) in two stages.

Next, a configuration of the sealing member 22 is described. The sealing member 22 includes a second inclined surface 37 in a region on the second side in the axial direction between the radially outer portion 40 having a cylindrical shape and the radially inner portion 39 having an annular shape. The second inclined surface 37 has a shape having a diameter increasing toward the second side in the axial direction. The second inclined surface 37 of the present embodiment is a tapered surface having an inside diameter d2 that is largest at an end 37a on the second side in the axial direction. The second inclined surface 37 is inclined at an angle Q2 with respect to a virtual cylindrical surface H2 around the bearing central axis C (see FIG. 1).

The second inclined surface 37 is formed in a part of the elastic member 46 included in the sealing member 22. More specifically, a part forming the second inclined surface 37 is included in the elastic annular portion 41 (the first annular portion 41a) that is a part of the elastic member 46. The first inclined surface 33 and the second inclined surface 37 are disposed such that a virtual extension surface 34 extending radially outwardly along the first inclined surface 33 intersects with the second inclined surface 37. Further, the second inclined surface 37 is continuous with the inner peripheral surface 38 of the radially outer portion 40.

With this configuration, as will be described later (as described above), after foreign matter such as muddy water inside the internal space S is guided, by centrifugal force, radially outwardly toward the first side in the axial direction along the first inclined surface 33 of the slinger 21, the foreign matter such as muddy water collides with the second inclined surface 37 so as to be guided radially outwardly toward the second side in the axial direction along the second inclined surface 37, and then, the foreign matter can further flow toward the second side in the axial direction along the inner peripheral surface 38 of the radially outer portion 40.

A central inclined surface 79 is provided radially inward of the second inclined surface 37, and an annular side face 78 is provided further radially inward of the central inclined surface 79. The side face 78 is parallel to the contact annular surface 60 of the slinger 21 such that the internal space S is not narrowed (i.e., the internal space S is not decreased) along the radial direction. The whole central inclined surface 79 is a tapered surface having a diameter increasing toward the first side in the axial direction such that the internal space S is enlarged. This decreases a resistance caused at the time when foreign matter such as muddy water inside the internal space S moves radially outwardly due to centrifugal force.

As described above, the slinger 21 includes the first inclined surface 33 provided on the radially outer side and a side facing the sealing member 22 such that the diameter of the first inclined surface 33 increases toward the first side in the axial direction. The sealing member 22 includes the second inclined surface 37 provided on the radially outer side and a side facing the slinger 21 such that the diameter of the second inclined surface 37 increases toward the second side in the axial direction. The second inclined surface 37 intersects with the virtual extension surface 34 extending radially outwardly along the first inclined surface 33, and the second inclined surface 37 is continuous with the inner peripheral surface 38 of the radially outer portion 40. With this configuration, as will be described next, muddy water entering the internal space S can be discharged to the outside (the outside of the sealing device 16) on the second side in the axial direction through the labyrinth gap 20.

Figure 4:
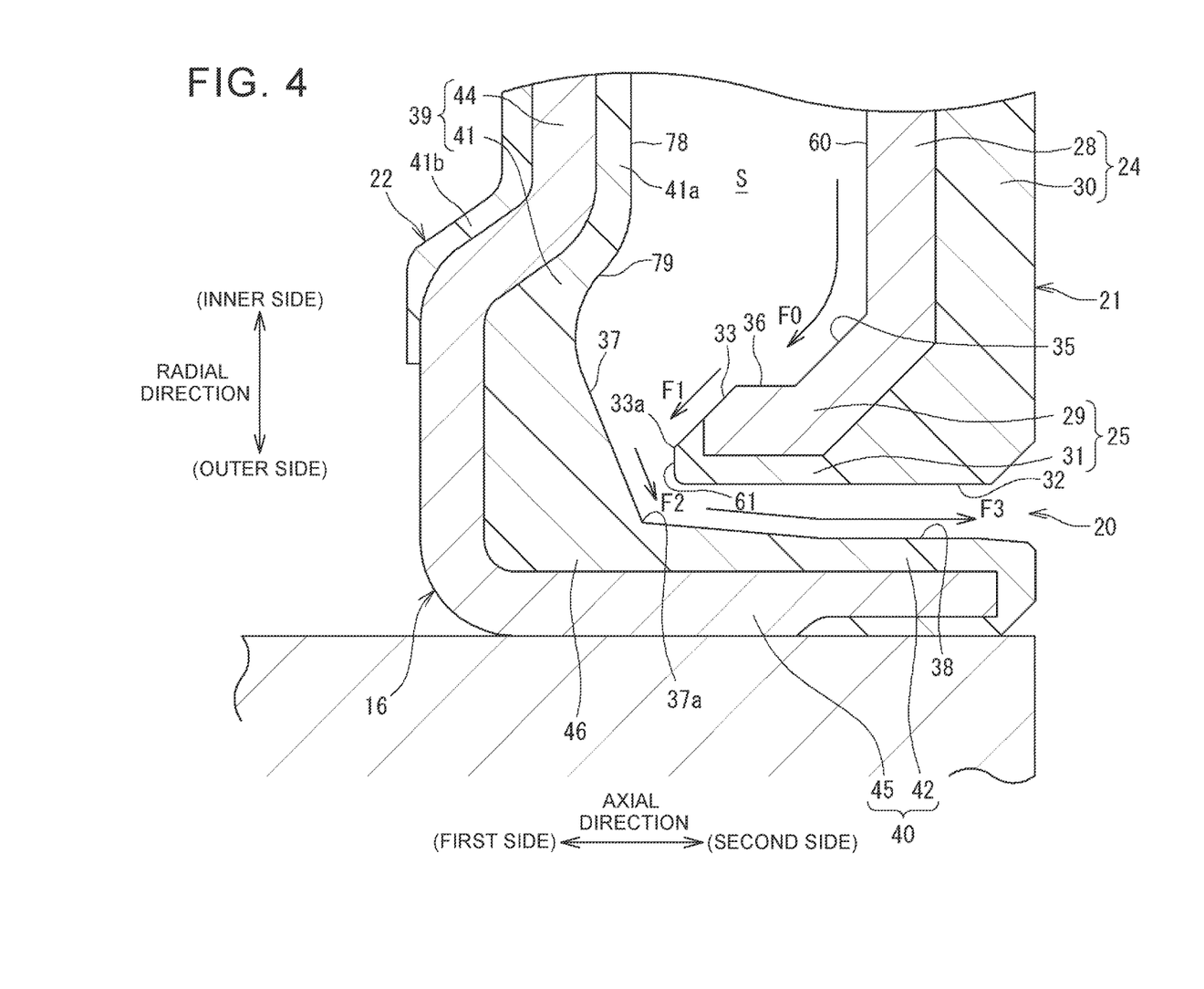
FIG. 4 is a sectional view of the outer peripheral part of the sealing device illustrated in FIG. 2 in an enlarged manner.

That is, in FIG. 2, when the slinger 21 rotates together with the inner shaft member 11, muddy water inside the internal space S moves radially outwardly due to centrifugal force as indicated by an arrow F0 in FIG. 4. As a result, as indicated by an arrow F1 in FIG. 4, the muddy water is guided radially outwardly toward the first side in the axial direction along the first inclined surface 33 of the slinger 21 and after that, as indicated by an arrow F2 in FIG. 4, the muddy water is guided radially outwardly toward the second side in the axial direction along the second inclined surface 37 of the sealing member 22. Further, as indicated by an arrow F3 in FIG. 4, the muddy water flows along the inner peripheral surface 38 of the radially outer portion 40 continuous with the second inclined surface 37, and thus, the muddy water is discharged to the outside of the sealing device 16 through the labyrinth gap 20. Thus, with the sealing device 16 of the present embodiment, even if muddy water enters the internal space S, the muddy water is guided along the first inclined surface 33 and the second inclined surface 37 by centrifugal force due to rotation. Thus, the muddy water can be easily discharged to the outside of the sealing device 16.

Further, in the present embodiment, the slinger 21 includes the auxiliary inclined surface 35 as described above. The auxiliary inclined surface 35 is provided on the side facing the sealing member 22 at a position radially inward of the first inclined surface 33. When muddy water flows radially outwardly along the contact annular surface 60 by centrifugal force in the internal space S, the muddy water is first guided radially outwardly toward the first side in the axial direction along the auxiliary inclined surface 35 as indicated by the arrow F0 in FIG. 4. Then, as indicated by the arrow F1 in FIG. 4, the muddy water thus guided can be guided radially outwardly toward the first side in the axial direction along the first inclined surface 33. That is, the muddy water in the internal space S can be gradually guided radially outwardly toward the first side in the axial direction by the auxiliary inclined surface 35 and the first inclined surface 33. Further, each of the first inclined surface 33 and the auxiliary inclined surface 35 is a tapered surface, and thus, when the muddy water flows, the muddy water can be guided such that the first inclined surface 33 and the auxiliary inclined surface 35 can hardly disturb the flow of the muddy water.

As illustrated in FIG. 3, in a section including the bearing central axis C (see FIG. 1), an angle Q4 formed between the second inclined surface 37 and the virtual extension surface 34 (the first inclined surface 33) is less than 90° (Q4<90°). Therefore, as illustrated in FIG. 4, when muddy water guided along the first inclined surface 33 hits the second inclined surface 37, a direction where the muddy water moves along the second inclined surface 37 is easily directed radially outwardly. This can further easily discharge the muddy water through the labyrinth gap 20.

Further, in the present embodiment, a distance P (see FIG. 3), in the axial direction, from the second inclined surface 37 to the first inclined surface 33 and the virtual extension surface 34 gradually decreases in a direction toward the radially outer side. Therefore, the muddy water in the internal space S is gathered on the radially outer side by centrifugal force between the second inclined surface 37, and the first inclined surface 33 and the virtual extension surface 34. Thus, a component of velocity of the muddy water directed radially outwardly becomes larger, and accordingly, the muddy water can be easily discharged to the outside of the sealing device 16 through the labyrinth gap 20.

With the sealing device 16 (see FIG. 2) of the present embodiment configured as described above, even if foreign matter such as muddy water flows or scatters from the outside of the sealing device 16 on the second side in the axial direction (e.g., from the knuckle to which the outer ring 12 is attached, a constant velocity joint to which the second side of the wheel bearing apparatus 10 in the axial direction is connected (i.e., to which the inner side of the wheel bearing apparatus 10 in the vehicle width direction is connected), and the like (not shown)), the labyrinth gap 20 can restrain the foreign matter such as muddy water from entering the internal space S. Further, even if foreign matter such as muddy water enters the internal space S, when the wheel bearing apparatus 10 rotates, the foreign matter can be eventually discharged by the functions of the first inclined surface 33 and the second inclined surface 37. That is, it is possible to restrain the foreign matter such as muddy water from staying in the internal space S. This consequently makes it possible to achieve a long life of the sealing device 16.

Manufacturing of the sealing member 22 will be described. As described above, the sealing member 22 includes the metal core 49 and the rubber elastic member 46 fixed to the metal core 49. The elastic member 46 is formed with the use of a mold, and at the time of forming, the metal core 49 is set in the mold. That is, the sealing member 22 is manufactured by insert molding, and the elastic member 46 is bonded to the metal core 49 by vulcanization. As described above, a part forming the second inclined surface 37 is included in the elastic annular portion 41 (the first annular portion 41a) that is a part of the elastic member 46. Accordingly, surfaces of the elastic member 46 such as the second inclined surface 37 are formed in accordance with shapes of corresponding parts of the mold. That is, when a part of the mold has a predetermined shape, the second inclined surface 37 can be formed in the tapered shape as described above, and thus, the second inclined surface 37 can be easily formed.

The embodiment described herein is just an example in all respects and is not limitative. That is, the wheel bearing apparatus 10 (the sealing device 16) of the disclosure is not limited to the embodiment illustrated herein, and may be implemented in other embodiments within the scope of the disclosure. For example, the number of lips provided in the sealing member 22 is not limited to three, and may be two, for example, although not illustrated herein. Further, the embodiment describes a case where the first inclined surface 33 provided in the slinger 21 is formed by a part (the outer tubular body portion 29) of the slinger body portion 26 and a part (the outer peripheral coating portion 31) of the coating portion 27. Alternatively, the whole first inclined surface 33 (furthermore, the whole auxiliary inclined surface 35) may be formed by the coating portion 27. Further, the embodiment describes a case where the slinger 21 includes the coating portion 27 in addition to the slinger body portion 26, but the coating portion 27 may be omitted. In this case, the first inclined surface 33 (furthermore, the auxiliary inclined surface 35) is formed on the first side, in the axial direction, of the outer tubular body portion 29 included in the slinger body portion 26. Each of the first inclined surface 33, the second inclined surface 37, and the auxiliary inclined surface 35 may have a shape other than the tapered surface inclined in a linear shape as illustrated herein, and may have a curved shape having a diameter increasing in the axial direction.

What is claimed is:

1. A sealing device configured to prevent foreign matter from entering an annular space formed between a cylindrical outer ring and an inner shaft member provided radially inward of the outer ring, the sealing device comprising:
   a slinger having an annular shape and attached to the inner shaft member; and
   a sealing member including a radially outer portion having a cylindrical shape and attached to the outer ring so as to face an outer peripheral surface of the slinger via a gap, a radially inner portion extending radially inwardly from the radially outer portion, and a lip extending from the radially inner portion so as to be in contact with the slinger, wherein:
   the slinger has a first inclined surface provided on a radially outer side and on a side facing the sealing member such that a diameter of the first inclined surface increases toward a first side in an axial direction;
   the sealing member has a second inclined surface provided on the radially outer side, the second inclined surface being provided on a side facing the slinger such that a diameter of the second inclined surface increases toward a second side in the axial direction;
   the second inclined surface intersects with a virtual extension surface extending radially outwardly along the first inclined surface, and the second inclined surface is continuous with an inner peripheral surface of the radially outer portion; and
   an angle, formed between the second inclined surface and the virtual extension surface and located (1) on the first side in the axial direction of the virtual extension surface, (2) on the second side in the axial direction of the second inclined surface, and (3) in a section including a bearing central axis, is less than 90°.

2. A wheel bearing apparatus comprising:
   an outer ring attached to a vehicle-body-side member;
   an inner shaft member including a flange portion to which a wheel is attached, the flange portion being provided at a position on a first side in an axial direction;
   a plurality of rolling elements provided in an annular space between the outer ring and the inner shaft member;
   a cage configured to hold the plurality of rolling elements; and
   a sealing device provided on a second side in the axial direction and configured to prevent foreign matter from entering the annular space from between the outer ring and the inner shaft member, wherein:
   the sealing device includes
      a slinger having an annular shape and attached to the inner shaft member at a position on the second side in the axial direction, and
      a sealing member including a radially outer portion having a cylindrical shape and attached to the outer ring at a position on the second side in the axial direction so as to face an outer peripheral surface of the slinger via a gap, a radially inner portion extending radially inwardly from the radially outer portion, and a lip extending from the radially inner portion so as to be in contact with the slinger;
   the slinger has a first inclined surface provided on a radially outer side and on a side facing the sealing member such that a diameter of the first inclined surface increases toward the first side in the axial direction;

the sealing member has a second inclined surface provided on the radially outer side, the second inclined surface being provided on a side facing the slinger such that a diameter of the second inclined surface increases toward the second side in the axial direction;

the second inclined surface intersects with a virtual extension surface extending radially outwardly along the first inclined surface, and the second inclined surface is continuous with an inner peripheral surface of the radially outer portion; and an angle, formed between the second inclined surface and the virtual extension surface and located (1) on the first side in the axial direction of the virtual extension surface, (2) on the second side in the axial direction of the second inclined surface, and (3) in a section including a bearing central axis, is less than 90°.

3. The wheel bearing apparatus according to claim 2, wherein the slinger has an auxiliary inclined surface provided on the side facing the sealing member at a position radially inward of the first inclined surface such that a diameter of the auxiliary inclined surface increases toward the first side in the axial direction.

4. The wheel bearing apparatus according to claim 2, wherein:

the slinger includes
an inner cylindrical portion attached to the inner shaft member at a position on the second side in the axial direction,
an annular portion extending radially outwardly from the inner cylindrical portion, and
an outer cylindrical portion extending toward the first side in the axial direction from a radially outer end of the annular portion;

the first inclined surface is provided on an inner peripheral side portion of the outer cylindrical portion; and the gap is formed between the inner peripheral surface of the radially outer portion and an outer peripheral surface of the outer cylindrical portion such that the gap serves as a labyrinth gap that restrains entrance of the foreign matter.

5. The wheel bearing apparatus according to claim 2, wherein:

the sealing member includes a metal core, and an elastic member fixed to the metal core; and a part forming the second inclined surface is included in a part of the elastic member.

6. The wheel bearing apparatus according to claim 2, wherein:

the first inclined surface is a tapered surface having an inside diameter that is largest at an end on the first side in the axial direction;

the second inclined surface is a tapered surface having an inside diameter that is largest at an end on the second side in the axial direction; and a distance, in the axial direction, from the second inclined surface to the first inclined surface and the virtual extension surface gradually decreases toward the radially outer side.

* * * * *